United States Patent
Mitsuda et al.

(10) Patent No.: US 12,182,497 B2
(45) Date of Patent: Dec. 31, 2024

(54) UTTERANCE SENTENCE EXTENSION APPARATUS, UTTERANCE SENTENCE GENERATOR APPARATUS, UTTERANCE SENTENCE EXTENSION METHOD, AND PROGRAM

(71) Applicant: NIPPON TELEGRAPH AND TELEPHONE CORPORATION, Tokyo (JP)

(72) Inventors: Ko Mitsuda, Tokyo (JP); Ryuichiro Higashinaka, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 526 days.

(21) Appl. No.: 17/603,418

(22) PCT Filed: Apr. 10, 2020

(86) PCT No.: PCT/JP2020/016148
§ 371 (c)(1),
(2) Date: May 4, 2022

(87) PCT Pub. No.: WO2020/213530
PCT Pub. Date: Oct. 22, 2020

(65) Prior Publication Data
US 2022/0261536 A1 Aug. 18, 2022

(30) Foreign Application Priority Data
Apr. 16, 2019 (JP) .................. 2019-078135

(51) Int. Cl.
*G06F 40/166* (2020.01)
*G06F 40/242* (2020.01)
(Continued)

(52) U.S. Cl.
CPC .......... *G06F 40/166* (2020.01); *G06F 40/242* (2020.01); *G06F 40/253* (2020.01); *G06F 40/268* (2020.01)

(58) Field of Classification Search
CPC .... G06F 40/166; G06F 40/242; G06F 40/253; G06F 40/268; G10L 15/22
See application file for complete search history.

(56) References Cited

U.S. PATENT DOCUMENTS

2016/0092447 A1* 3/2016 Venkataraman .... G06F 16/9535
707/765
2017/0060839 A1* 3/2017 Kawamura ............. G10L 25/63
(Continued)

OTHER PUBLICATIONS

Vinyals et al. (2015) "A Neural Conversational Model," ICML, Jul. 6, 2015.

*Primary Examiner* — Abul K Azad

(57) ABSTRACT

An expanded utterance that is used to output a more appropriate output utterance for an utterance can be generated. An utterance sentence expansion device includes an expansion unit that inserts, for an utterance that is an utterance to be expanded that includes a noun and is morphologically analyzed in advance, by using information of an expansion dictionary, which includes higher-level categories of the noun, one or more higher-level categories of the expansion dictionary corresponding to the noun included in the utterance into a position before the noun of the utterance to generate an expanded utterance.

12 Claims, 9 Drawing Sheets

(51) Int. Cl.
*G06F 40/253* (2020.01)
*G06F 40/268* (2020.01)

(56) References Cited

U.S. PATENT DOCUMENTS

2017/0069316 A1* 3/2017 Makino .................. G10L 15/22
2017/0249297 A1* 8/2017 Venkataraman ........ G06F 40/35
2020/0183983 A1* 6/2020 Abe .................. G06F 16/90332

* cited by examiner

* Surfing is fun

Fig. 3

Leisure watersports surfing are fun

Fig. 5

| ID | UTTERANCE | BEFORE | AFTER | OUTPUT BEFORE EXPANSION | OUTPUT AFTER EXPANSION |
|---|---|---|---|---|---|
| 1 | I want to eat ice cream | OO | OO | because it tasts the best on a hot day | because it is cold and tasty |
| 2 | Tiny cars are popular recently | OO | OO | because of a good design | because of good gas mileage |
| 3 | Walking is good for health | XX | OO | because it is also good for health | because it is refreshing |
| 4 | It is better to be able to speak English | XX | OO | because you can be proud to the world | because it expands the world |
| 5 | I am interested in cars | XX | XO | because this is a good car | because driving is fun |
| 6 | SNS is fun | XO | OO | because you can forget time | because there is a new discovery |
| 7 | Plover pattern is stlylish | XX | OO | because of its good aroma | because it is unique |
| 8 | Alcohol is delicious | OO | XX | because it makes feel better | because it is summer |
| 9 | Points are great values | XX | XX | because points increase | because points rise over time |
| 10 | Sake is delicious | OX | OX | because it makes feel better | because it is refreshing |
| 11 | Reading is fun | OO | OO | because it increases knowledge | because it expands the world |
| 12 | Traveling is expensive | XX | OO | because there is a new discovery | because the transportation costs are high |

Fig. 9

UTTERANCE SENTENCE EXTENSION APPARATUS, UTTERANCE SENTENCE GENERATOR APPARATUS, UTTERANCE SENTENCE EXTENSION METHOD, AND PROGRAM

CROSS-REFERENCE TO RELATED APPLICATIONS

This application is a U.S. 371 Application of International Patent Application No. PCT/JP2020/016148, filed on 10 Apr. 2020, which application claims priority to and the benefit of JP Application No. 2019-078135, filed on 16 Apr. 2019, the disclosures of which are hereby incorporated herein by reference in their entireties.

TECHNICAL FIELD

The present disclosure relates to an utterance sentence expansion device, an utterance sentence generation device, an utterance sentence expansion method, and a program.

BACKGROUND ART

Through a dialogue system, a person interacts with a computer to obtain various pieces of information and satisfy demands. Further, there is also a dialogue system that does not only achieve a predetermined task, but also performs daily conversation. Such dialogue systems allow a person to obtain mental stability, satisfy desire for recognition, and build trust. Types of the dialogue system are described in Reference 1.

[Reference 1] KAWAHARA Tatsuya, A Brief History of Spoken Dialogue Systems: Evolution and Recent Technical Trend, Journal of Japanese Society for Artificial Intelligence, Vol. 28, No. 1, p45-51, 2013

In recent years, in dialogue systems, an utterance generation model using deep learning has been noted as a method to output the output utterance of a system for input user utterances. This method is a method of preparing training data in which an utterance and an output utterance are paired, and training a model that generates an utterance based on the training data. The utterance generation model captures an input utterance sentence and an output utterance as vectors, and learns the correspondence relationship of the vectors. Utilizing the utterance generation model allows understanding of a meaning and content, rather than the text string, of the input utterance sentence, and the quality of the output utterance is improved. Details of the utterance generation model are described in Non Patent Literature 1.

In training of the utterance generation model and the generation of an output utterance using the utterance generation model, generally-available information is only the information included in an utterance. Specifically, the output utterance is generated based on a token sequence (a morpheme sequence in the case of Japanese) included in the utterance.

CITATION LIST

Non Patent Literature

Non Patent Literature 1: Vinyals, O., Le, Q.: A Neural Conversational Model. In: Proc. ICML Deep Learning Workshop (2015)

SUMMARY OF THE INVENTION

Technical Problem

In the training of the utterance generation model, the training data is utilized to learn correspondence to an output utterance from an utterance. Further, because training data available to learning is limited in amount, there is a case where the generation model cannot generate an appropriate output utterance for an unknown input that does not include a token sequence similar to the training data. The unknown input is, for example, an unknown word which is an unknown noun included in a token sequence. The unknown word is specifically a noun that does not appear in an input utterance sentence of the training data and appears in an utterance sentence at the time of utterance generation. In order to solve this problem, a mechanism to discover a case where the unknown input and the token sequence are different but similar in meaning is required for the generation model by using resources different from the training data.

In light of the foregoing, an object of the present disclosure is to provide an utterance sentence expansion device, an utterance sentence expansion method, and a program capable of generating an expanded utterance used to output a more appropriate output utterance for an utterance.

Further, an object of the present disclosure is to provide an utterance sentence generation device that can output a more appropriate output utterance for an utterance.

Means for Solving the Problem

To achieve the above object, an utterance sentence expansion device according to a first disclosure is configured to include an expansion unit that inserts, for an utterance that is an utterance to be expanded that includes a noun and is morphologically analyzed in advance, by using information of an expansion dictionary, which includes a plurality of higher-level categories of the noun, one or more higher-level categories of the plurality of higher-level categories of the expansion dictionary corresponding to the noun included in the utterance into a position before the noun of the utterance to generate an expanded utterance.

Further, in the utterance sentence expansion device according to the first disclosure, in a case of inserting the plurality of higher-level categories of the expansion dictionary corresponding to the noun included in the utterance, the expansion unit may insert, into a position before the noun of the utterance, the plurality of higher-level categories in such an order that, among the plurality of higher-level categories, a category in a higher-level hierarchy is closer to a beginning of a sentence to generate the expanded utterance.

Further, an utterance sentence generation device according to a second disclosure uses the expansion unit according to the first disclosure to output an output utterance by using an utterance sentence as an input and using the expanded utterance generated from the utterance sentence as an input to an utterance generation model that is trained in advance, in which the utterance generation model is trained in advance by the expansion unit by using an input utterance sentence included in training data as an input and the expanded utterance generated from the input utterance sentence as an input utterance sentence of the training data.

An utterance sentence expansion method according to a third disclosure is executed by including inserting, for an utterance that is an utterance to be expanded that includes a noun and is morphologically analyzed in advance, by using information of an expansion dictionary, which includes a plurality of higher-level categories of the noun, one or more higher-level categories of the plurality of higher-level categories of the expansion dictionary corresponding to the noun included in the utterance into a position before the noun of the utterance to generate an expanded utterance.

A program according to a fourth disclosure is a program causing a computer to perform operations including inserting, for an utterance that is an utterance to be expanded that includes a noun and is morphologically analyzed in advance, by using information of an expansion dictionary, which includes a plurality of higher-level categories of the noun, one or more higher-level categories of the plurality of higher-level categories of the expansion dictionary corresponding to the noun included in the utterance into a position before the noun of the utterance to generate an expanded utterance.

Effects of the Invention

According to the utterance sentence expansion device, the utterance sentence expansion method, and the program of the present disclosure, it is possible to obtain an effect that an expanded utterance used for outputting a more appropriate output utterance for an utterance can be generated.

Further, according to the utterance sentence generation device of the present disclosure, it is possible to obtain an effect that a more appropriate output utterance can be output for an utterance.

BRIEF DESCRIPTION OF DRAWINGS

FIG. 3 is a diagram illustrating an example of an output of a morphological analysis unit.

FIG. 5 is a diagram that illustrates an example of an output of an expanded utterance expanded by an expansion unit.

FIG. 9 is a diagram that shows an example of a comparison result before and after expansion in an experiment.

DESCRIPTION OF EMBODIMENTS

Hereinafter, embodiments of the present disclosure will be described in detail with reference to the drawings.

In embodiments of the present disclosure, in training data and test data, a category (information which is a high-level concept of a noun) is assigned to a noun included in an utterance, so that an expanded utterance is created as an utterance in which the noun is generalized. Training of an utterance generation model and generation of an output utterance using the test data can be performed based on the expanded utterance. For the assignment of a category, the information of an expansion dictionary, which is a dictionary containing information of a high-level category of a word, is used. As the information of an expansion dictionary, for example, the category information of a thesaurus and Wikipedia (trade name) can be used. Wikipedia (trade name), which covers a variety of nouns, contains high-level concepts of nouns as a tree of categories. In the embodiments of the present disclosure, a case where the category information of Wikipedia (trade name) is used as the category information of the expansion dictionary will be described as an example. The category information can be created by analyzing dump data of Wikipedia (trade name) and putting the data together as a database.

Figure 1:
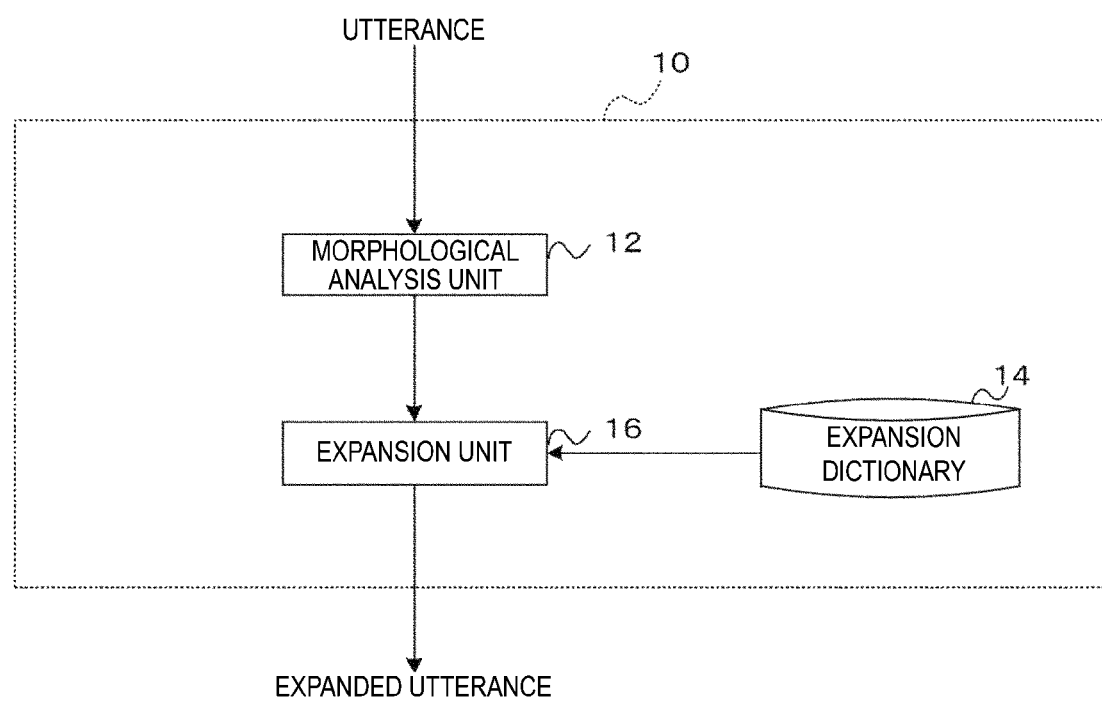
FIG. 1 is a block diagram illustrating a configuration of an utterance sentence expansion device according to an embodiment of the present disclosure.

Configuration of Utterance Sentence Expansion Device According to Embodiment of Present Disclosure FIG. 1 is a block diagram illustrating an example of a system configuration of an utterance sentence expansion device 10 according to an embodiment of the present disclosure.

The utterance sentence expansion device 10 having the configuration illustrated in FIG. 1 can be composed of a computer including a central processing unit (CPU), a random access memory (RAM), a program for executing each processing routine described below, and a read only memory (ROM) storing various pieces of data.

Figure 2:
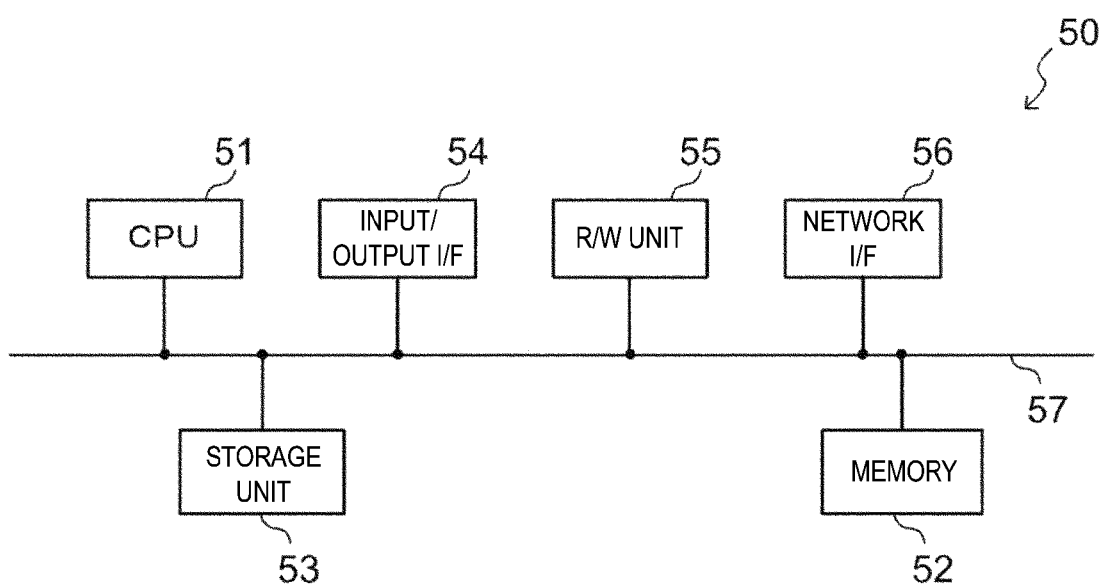
FIG. 2 is a schematic block diagram illustrating an example of a computer serving as an utterance sentence expansion device.

FIG. 2 is a schematic block diagram illustrating an example of the computer serving as the utterance sentence expansion device 10. For example, the utterance sentence expansion device 10 can be implemented by a computer 50 illustrated in FIG. 2. The computer 50 includes a CPU 51, a memory 52 as a temporary storage area, and a non-volatile storage unit 53. Further, the computer 50 includes an input/output interface (I/F) 54 to which an input/output device (not illustrated) or the like is connected, and a read/write (R/W) unit 55 that controls reading and writing of data from and to a recording medium. Further, the computer 50 includes a network I/F 56 connected to a network, such as the Internet. The CPU 51, the memory 52, the storage unit 53, the input/output I/F 54, the R/W unit 55, and the network I/F 56 are connected to each other via a bus 57.

The storage unit 53 can be implemented by a hard disk drive (HDD), a solid state drive (SSD), a flash memory, or the like. A program for causing the computer 50 to function is stored in the storage unit 53 as a storage medium. The CPU 51 reads the program from the storage unit 53 and loads the program into the memory 52, and sequentially executes processes that the program has.

Described above is an example of the electrical configuration of the computer in FIG. 2. Note that the electrical configuration of the computer in the utterance sentence generation device described below is also similar.

Hereinafter, the utterance sentence expansion device 10 of FIG. 1 will be described. As illustrated in FIG. 1, the utterance sentence expansion device 10 is configured to include a morphological analysis unit 12, an expansion dictionary 14, and an expansion unit 16.

In embodiments of the present disclosure, a case where the utterance sentence expansion device 10 expands an utterance of support utterance pair data using a dialogue system as a support utterance generation system. The support utterance pair data is data in which an utterance that expresses a positive (or negative) opinion on a particular topic and a specific reason for the utterance are paired as an utterance and an output utterance. The pair of an utterance and an output utterance of the support utterance pair data is, for example, a pair of the output utterance "the sea is beautiful" for the utterance "Yokohama is good".

Note that the subject of application of the present method is not limited to an utterance of the support utterance pair data, but can be applied to an utterance of optional utterance pair data, such as utterance pair data relating to a question, utterance pair data relating to counterargument, and the like.

Hereinafter, each processing unit of the utterance sentence expansion device 10 will be described.

The morphological analysis unit 12 receives an utterance of one optional sentence, performs morphological analysis to write with a space between words of the utterance, and outputs a noun that appears first. The noun that appears first is a noun that is the subject of expansion using the category information of the expansion dictionary 14. In a case where no noun is included, no noun information is included in the output and expansion of an utterance is not performed. The expansion unit 16 searches for whether a noun to be expanded output by the morphological analysis unit 12 is included in the category information in the expansion dictionary 14. In a case where the noun is contained, the expansion unit 16 outputs text obtained by adding the corresponding category as a string to the front of the noun as an expanded utterance. Training the utterance generation model based on the expanded utterance and the output utterance in a pair with the original utterance allows generation of an appropriate support utterance for a wider variety of utterances.

Examples of the utterance are, for example, "サーフィンは楽しい". In the case of this example, "サーフィン" is a noun that appears first in the utterance, and is a noun to be expanded.

For a morphological analyzer used in the morphological analysis unit 12, an optional tool that can write with a space between words of input Japanese can be used. In the present embodiment, JTAG (Reference 2) developed by NTT is used.

[Reference 2] Fuchi, T., Takagi, S.: Japanese Morphological Analyzer Using Word Co-occurrence-JTAG-. In: Proc. COLING (1998)

Figure 3:
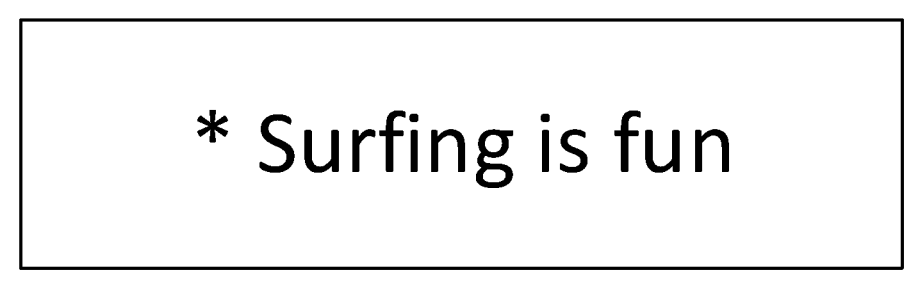

FIG. 3 is a diagram illustrating an example of an output of the morphological analysis unit 12. As a result of the morphological analysis, the utterance is written with a space between words, and "*" indicating the expansion target is assigned to the noun "サーフィン" to be expanded.

Note that morphological analysis may be performed by an external device, and an utterance for which morphological analysis has already been performed in advance may be accepted. Further, units of the writing with a space between words by the morphological analysis unit 12 desirably match with units of an utterance input when the utterance generation is performed by the utterance generation model. This similarly applies to the units of the noun to be expanded.

Figure 4:
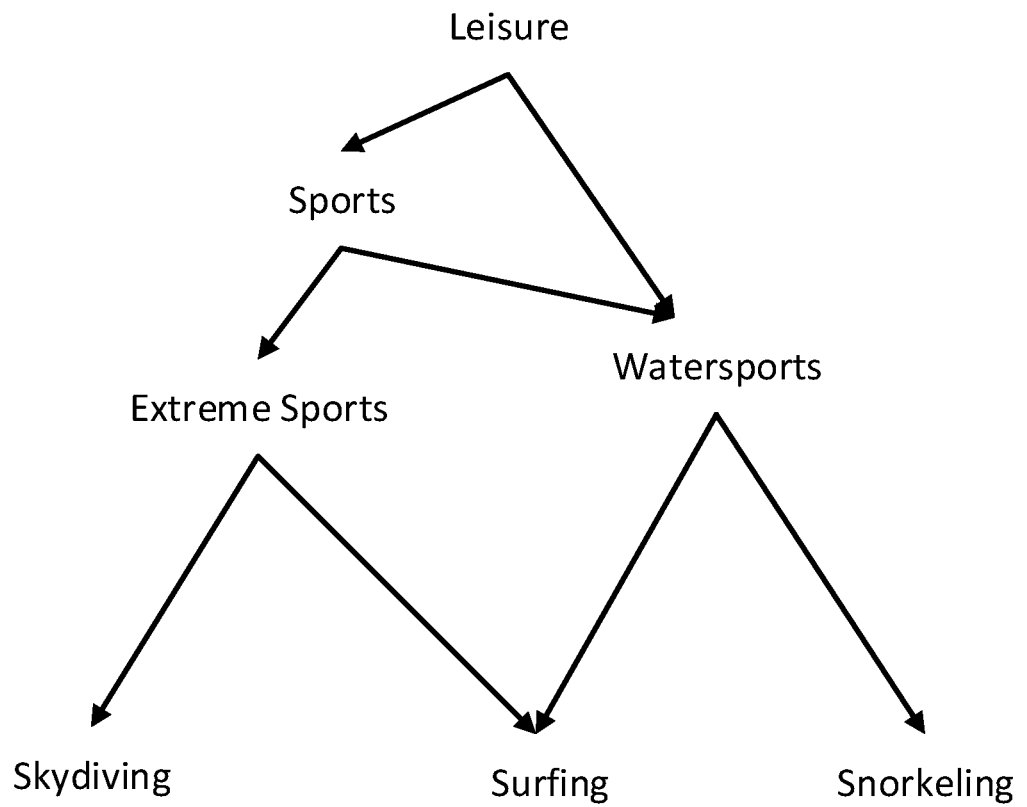
FIG. 4 is a diagram illustrating an example of a hierarchical category of category information.

The expansion dictionary 14 stores the category information described above. FIG. 4 is a diagram illustrating an example of a hierarchical category of the category information. As illustrated in FIG. 4, for the noun "サーフィン", there are "スカイダイビング" and "シュノーケリング" as nouns in the same hierarchy. Categories of these nouns are "エクストリームスポーツ" and "ウォータースポーツ". There is the category "スポーツ" in one higher-level category. Further, there is the category "レジャー" as a higher-level category of "スポーツ" and "ウォータースポーツ". Since the category connected to a higher category by a short distance tends to be a typical category, when expansion is performed by the expansion unit 16, the category connected to a main category by a short distance is applied as a category to be expanded. In the example of FIG. 4, "ウォータースポーツ" and "レジャー" are applied to the category for the noun "サーフィン". "エクストリームスポーツ", "スポーツ", and "レジャー" are applied to the category for the noun "スカイダイビング".

The expansion unit 16 generates an expanded utterance in which a category of an utterance is expanded for the utterance that has been morphologically analyzed by the morphological analysis unit 12. The expanded utterance is generated by using the category information of the expansion dictionary 14 and inserting N categories of the expansion dictionary 14 corresponding to the noun at the beginning included in the utterance into a position before the noun.

The expansion unit 16 checks whether the noun at the beginning of the utterance to be expanded that is received is registered in the category information of the expansion dictionary 14. In a case where the noun is registered, the expansion unit 16 inserts N higher-level categories of the noun into a position before the noun to be expanded to perform expansion. For N, an optional number, one or more, of values can be designated. In the present embodiment, the value of N is set to two in the present embodiment, because the best performance was achieved when the number was two in the example of the support utterance generation system.

FIG. 5 is a diagram that illustrates an example of an output of an expanded utterance expanded by the expansion unit 16. Since the value of N is set to two for the noun "サーフィン", "ウォータースポーツ" and"レジャー", which are the categories of the category information of the expansion dictionary 14, are assigned as categories. Here, in the expansion unit 16, the order in which the categories are inserted is such that the higher the level of the category, the closer to the beginning of the sentence. This is processing corresponding to the nature of the utterance generation model described in detail in Non Patent Literature 1. The utterance generation model, which performs reading into the utterance generation model in order from a token at the beginning of an utterance, that is, a morpheme in an utterance in Japanese, has the property that a morpheme at the back is more likely to be prioritized as the information used in the utterance generation. In view of such property, when inserting a plurality of N categories of the expansion dictionary 14, the expansion unit 16 inserts the categories into a position before the noun in order that, among the N categories, a category that is in a higher-level hierarchy is inserted closer to the beginning of the sentence to generate the expanded utterance. Compared to a higher-level category, a lower-level category and the noun to be expanded have a deeper relationship with the output utterance contained in the training data. In other words, an appropriate output utterance for a utterance that includes the noun to be expanded is not always appropriate for an utterance that includes a higher-level category. For this reason, insertion of a category is performed such that a lower-level category and the noun to be expanded are placed behind, so that a more appropriate output can be obtained.

Note that it is also conceivable to extend the utterance to a plurality of sentences such as "レジャーは楽しい" "ウォータースポーツは楽しい", and "サーフィンは楽しい". However, if the expansion is performed by a plurality of sentences in this way, there is a possibility that different output utterances are generated by input to the utterance generation model for each of the utterance sentences. In that case, it is necessary to select which utterance should be the final output utterance. In view of the above, in the present method, a format in which categories are arranged at the beginning in one sentence as described above is employed, so that the number of output utterances generated from the utterance generation model can be narrowed down by one.

Figure 6:
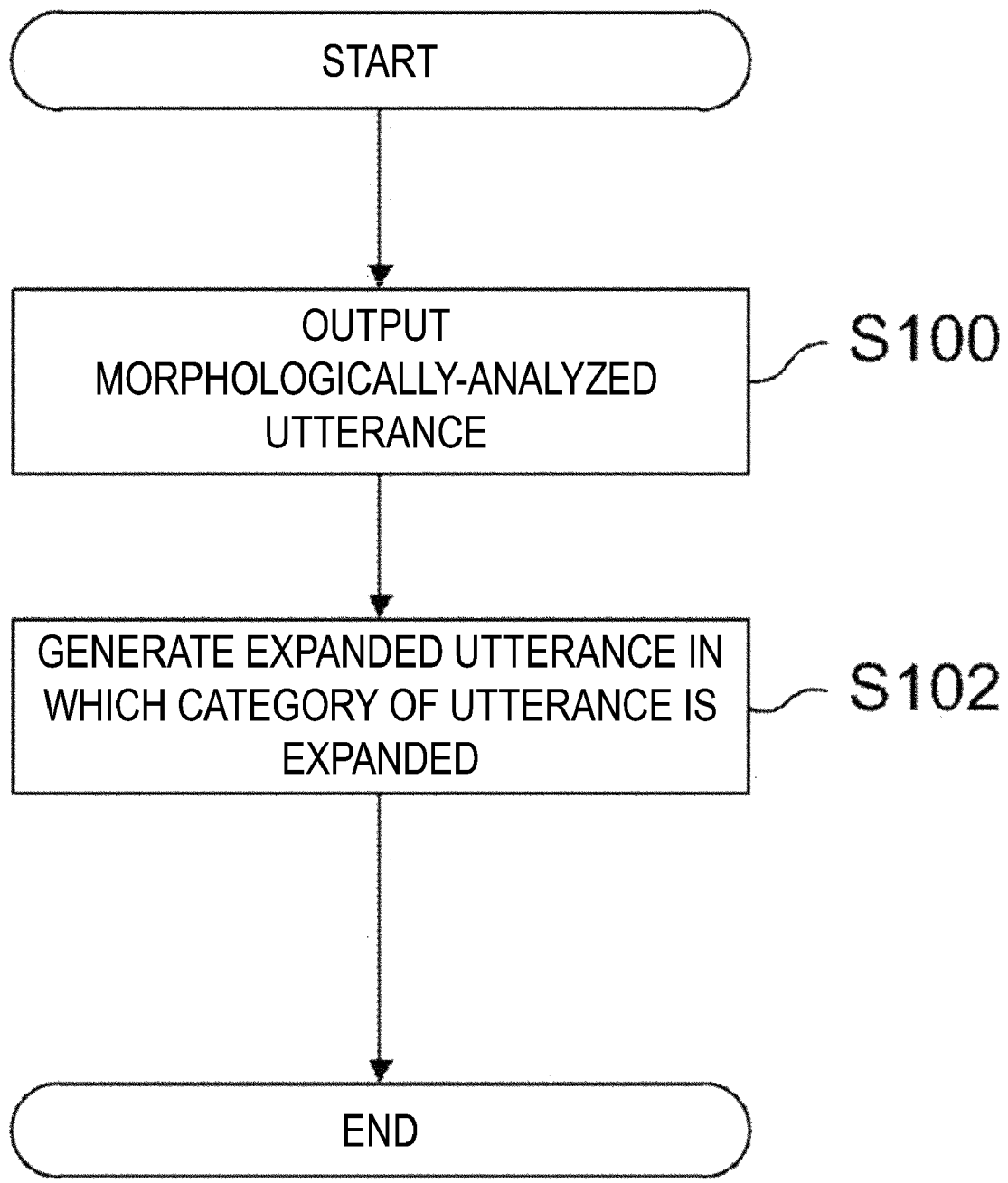
FIG. 6 is a flowchart illustrating processing routine in the utterance sentence expansion device according to the embodiment of the present disclosure.

Action of Utterance Sentence Expansion Device According to Embodiment of Present Disclosure Next, an action of the utterance sentence expansion device 10 according to the embodiment of the present disclosure will be described. FIG. 6 is an example of a flowchart illustrating a processing routine of the utterance sentence expansion device 10.

In Step S100, the morphological analysis unit 12 receives an utterance composed of one optional sentence and performs morphological analysis to output a morphologically-analyzed utterance that includes writing with a space between words of the utterance and a noun that appears first.

In Step S102, the expansion unit 16 generates an expanded utterance in which the category of the utterance is expanded for the utterance that has been morphologically analyzed by the morphological analysis unit 12. The expanded utterance is generated by using the category information of the expansion dictionary 14 and inserting N categories of the expansion dictionary 14 corresponding to the noun at the beginning included in the utterance into a position before the noun. When a plurality of N categories are inserted, the N categories are inserted into a position before the noun in the order that the category in the higher-order hierarchy is closer to the beginning.

As described above, according to the utterance sentence expansion device according to the embodiment of the present disclosure, it is possible to generate an expanded utterance used for outputting a more appropriate output utterance for the utterance.

Example of Utterance Sentence Generation Device

Figure 7:
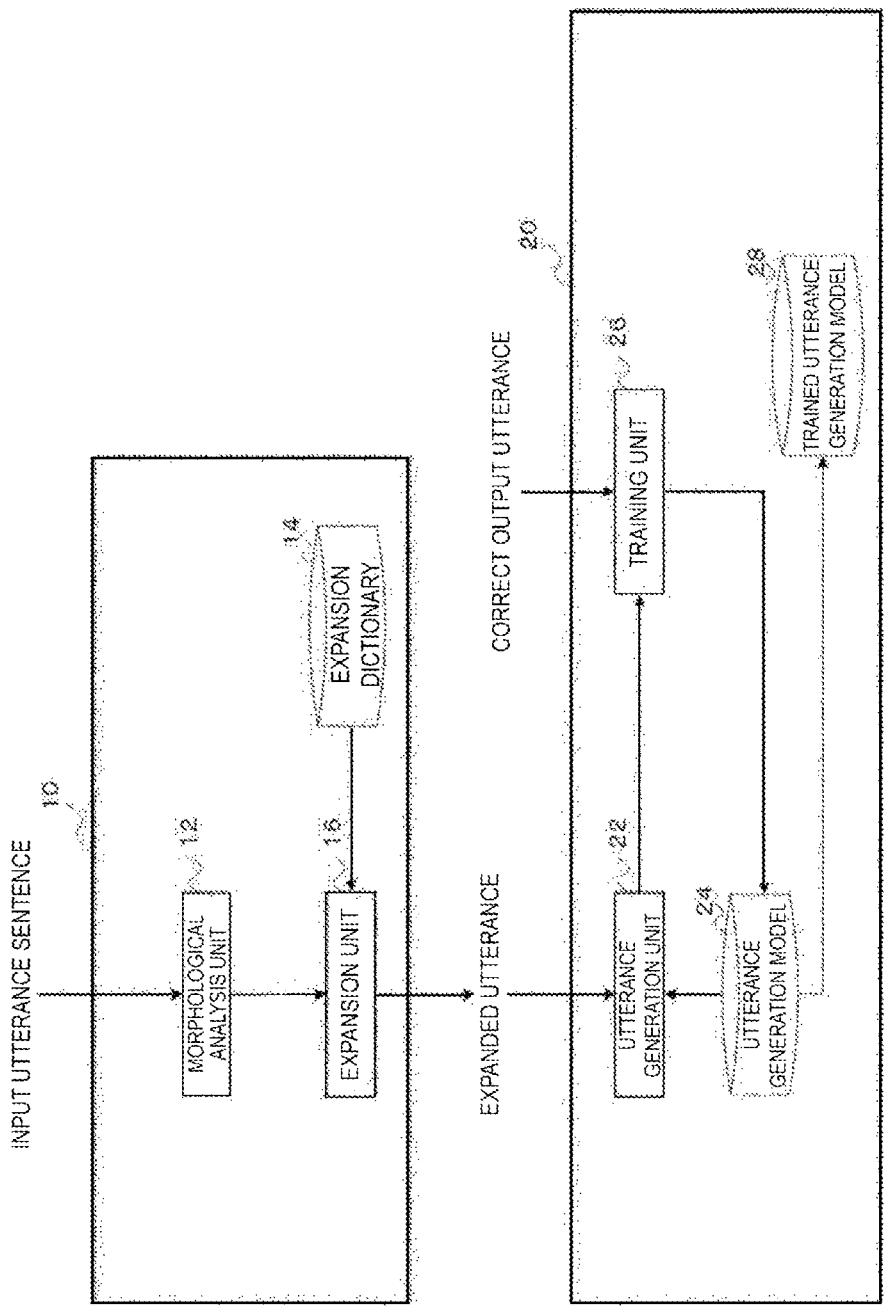
FIG. 7 is a diagram that illustrates a configuration when applied to an utterance sentence generation device for training of an utterance sentence generation model.
Figure 8:
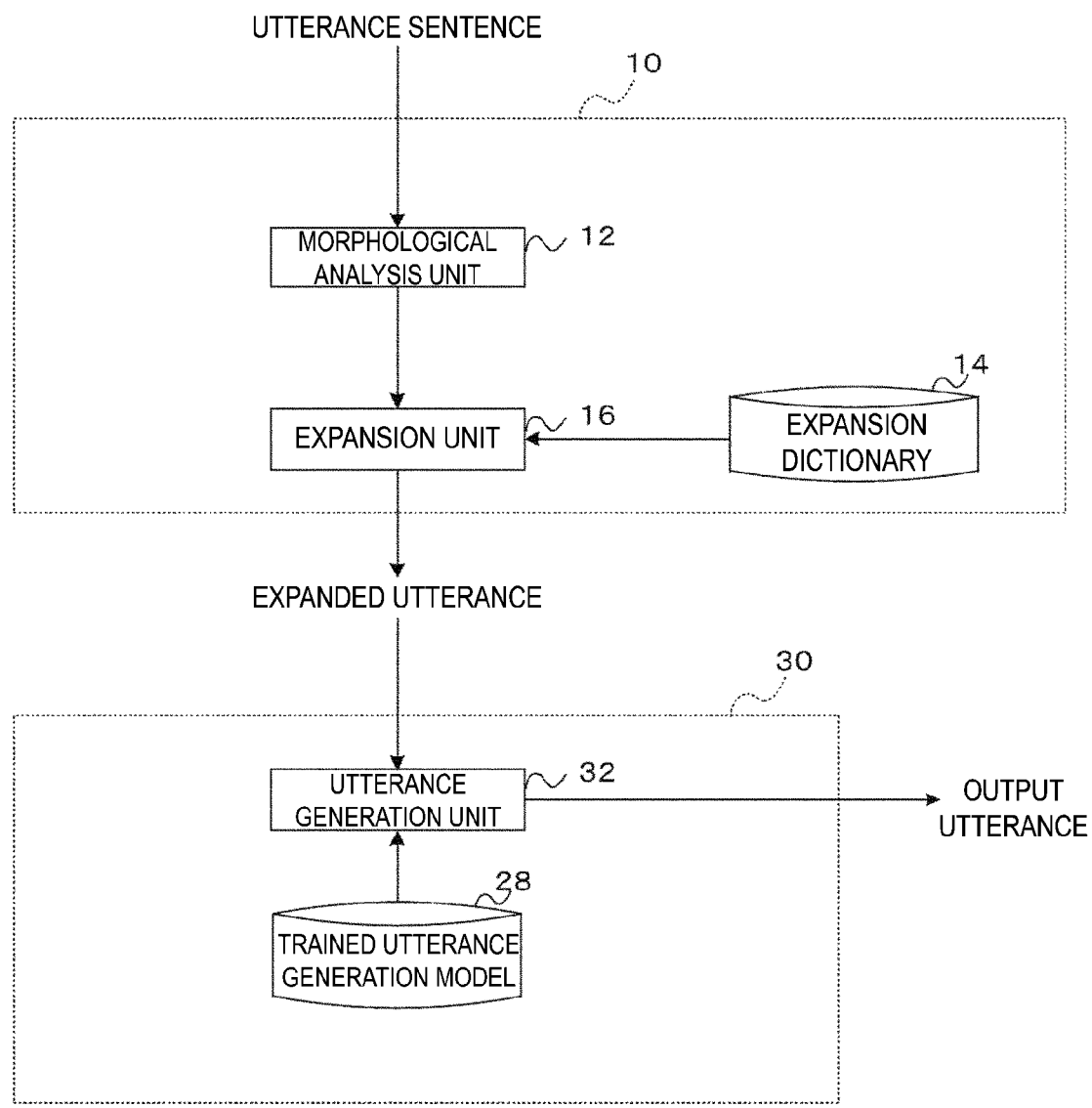
FIG. 8 is a diagram that illustrates a configuration when applied to an utterance sentence generation device for utterance sentence generation.

Next, an example of a case where the expanded utterance generated by the utterance sentence expansion device 10 is applied to the utterance sentence generation device will be described. FIG. 7 is a diagram that illustrates a configuration of a case where the expanded utterance is applied to the utterance sentence generation device for training of an utterance sentence generation model. FIG. 8 is a diagram that illustrates a configuration of a case where the expanded utterance is applied to the utterance sentence generation device for utterance sentence generation.

As illustrated in FIG. 7, a trained utterance generation model is obtained by using the expanded utterance as an input utterance sentence of training data. In FIG. 7, when an utterance sentence generation device 20 receives the expanded utterance, an utterance generation unit 22 generates an output utterance using an utterance generation model 24 and outputs the output utterance to a training unit 26. The training unit 26 receives the output utterance and a correct output utterance to perform leaning, and trains a model parameter of the utterance generation model 24. As a training method for example, a training method (for example. Reference 3) of the utterance generation model described in Non Patent Literature 1 is preferably used.

[Reference 3] OpenNMT, URL: https://github.com/OpenNMT/OpenNMT-py

The finally trained utterance generation model 24 becomes a trained utterance generation model 28. As described above, the processing target of the expansion unit 16 of the utterance sentence expansion device 10 illustrated in FIG. 7 is an input utterance sentence included in the training data. The expansion unit 16 generates an expanded utterance by using an input utterance sentence included in the training data as an input. The utterance sentence generation device 20 trains the utterance generation model 24 with the expanded utterance generated from the input utterance sentence as an input utterance sentence of the training data.

In FIG. 8, when an utterance sentence generation device 30 receives the expanded utterance, an utterance generation unit 32 generates an output utterance using the trained utterance generation model 28 and outputs the output utterance. As described above, the processing target of the expansion unit 16 of the utterance sentence expansion device 10 illustrated in FIG. 8 is an utterance sentence. The expansion unit 16 generates an expanded utterance by using an utterance sentence as an input. The utterance sentence generation device 30 outputs an output utterance using the expanded utterance generated from the utterance sentence as an input to the trained utterance generation model 28. Note that the utterance sentence generation devices illustrated in FIGS. 7 and 8 may be configured as an integral unit to perform training and application of the utterance generation model.

Example of Experiment

An experiment was performed regarding training and application of the utterance generation model of the support utterance generation system according to the examples of FIGS. 7 and 8 described above. FIG. 9 is a diagram that shows an example of a comparison result before and after expansion in the experiment. In FIG. 9, each column shows "utterance ID", "evaluation result of output of generation model before expansion (evaluation of two experts)", "evaluation result of output of utterance generation model after expansion (evaluation of two experts)". "output of utterance generation model before expansion", and "output of utterance generation model after expansion". In the evaluation results, D indicates a correct answer, and x indicates an incorrect answer. Comparing before and after expansion, a more appropriate utterance is shown to be able to be output in the output after expansion.

In the creation of the utterance generation model in the experiment, training data of 40 thousand pairs containing pairs of inputs and outputs was used. The training data was collected by manually describing the utterance using crowd-sourcing. JTAG of Reference 2 was used for writing with a space between words of an utterance and for writing with a space between words of an output utterance, and OpenNMT of Reference 3 was used for training the utterance generation model. By using the utterance generation model trained using the expanded utterance as in the experiment result, a plausible output utterance is more likely to be output for an utterance.

As described above, according to the utterance sentence generation device according to the embodiment of the present disclosure, training and application of the utterance generation model are performed using the expanded in which the category is expanded, so that a more appropriate output utterance can be output for an utterance.

Further, as an issue of the dialogue system, because there is a limit to the amount of typical training data that pairs utterances and output utterances, it is difficult to train an utterance generation model that covers all nouns included in an utterance in test data. In view of the above, the method of the embodiment of the present disclosure allows, by using category information of the expansion dictionary, a noun in training data classified in the same category as a noun that is not included in the training data but is included as an entry in the expansion dictionary to be handled as a similar case.

This makes it possible to train an utterance generation model capable of generating an appropriate output utterance for various types of utterances. For example, it is conceivable that an utterance that describes "surfing" is included in the training data, while an utterance that describes "snorkeling" is not included in the training data. In this case, the fact that surfing and snorkeling are similar concepts is not explicitly given at the time of training of the utterance generation model, so that an appropriate output utterance for snorkeling is not always generated. At this time, an utterance considering that surfing and snorkeling are "leisure relating to the sea" is created by using the expansion dictionary, so that the utterance generation model can generate an output for an utterance including snorkeling by using the training data relating to surfing, and can generate an appropriate output utterance.

Note that the present disclosure is not limited to the above-described embodiment, and various modifications and applications may be made without departing from the gist of the present disclosure.

REFERENCE SIGNS LIST

10 Utterance sentence expansion device
12 Morphological analysis unit
14 Expansion dictionary
16 Expansion unit
20, 30 Utterance sentence generation device
22, 32 Utterance generation unit
24 Utterance generation model
26 Training unit
28 Trained utterance generation model

The invention claimed is:

1. An utterance sentence expansion device comprising an expander configured to insert, for an utterance that is an utterance to be expanded that includes a noun and an unknown input and are morphologically analyzed in advance, by using information of an expansion dictionary, the expansion dictionary including a plurality of higher-level categories of the noun, one or more higher-level categories of the plurality of higher-level categories of the expansion dictionary corresponding to the noun included in the utterance into a position before a first noun of the utterance to generate an expanded utterance, wherein
the first noun is automatically indicated by a space and a symbol.

2. The utterance sentence expansion device according to claim 1, wherein
in a case of inserting the plurality of higher-level categories of the expansion dictionary corresponding to the noun included in the utterance, the expander inserts, into a position before the noun of the utterance, the plurality of higher-level categories in such an order that, among the plurality of higher-level categories, a category in a higher-level hierarchy is closer to a beginning of a sentence to generate the expanded utterance.

3. The utterance sentence expansion device according to claim 2, further comprising: providing an output utterance by using an utterance sentence as an input and using the expanded utterance generated from the utterance sentence as an input to an utterance generation model that is trained in advance, wherein
the utterance generation model is trained in advance by the expander by using an input utterance sentence included in training data as an input and the expanded utterance generated from the input utterance sentence as an input utterance sentence of the training data.

4. The utterance sentence expansion device according to claim 1, further comprising:
providing an output utterance by using an utterance sentence as an input and using the expanded utterance generated from the utterance sentence as an input to an utterance generation model that is trained in advance, wherein
the utterance generation model is trained in advance by the expander by using an input utterance sentence included in training data as an input and the expanded utterance generated from the input utterance sentence as an input utterance sentence of the training data.

5. An utterance sentence expansion method, comprising inserting, for an utterance that is an utterance to be expanded that includes a noun and an unknown input and are morphologically analyzed in advance, by an expander using information of an expansion dictionary, the expansion dictionary including a plurality of higher-level categories of the noun, one or more higher-level categories of the plurality of higher-level categories of the expansion dictionary corresponding to the noun included in the utterance into a position before a first noun of the utterance to generate an expanded utterance, wherein
the first noun is automatically indicated by a space and a symbol.

6. The utterance sentence expansion method according to claim 5, wherein
in a case of inserting the plurality of higher-level categories of the expansion dictionary corresponding to the noun included in the utterance, the expander inserts, into a position before the noun of the utterance, the plurality of higher-level categories in such an order that, among the plurality of higher-level categories, a category in a higher-level hierarchy is closer to a beginning of a sentence to generate the expanded utterance.

7. The utterance sentence expansion method according to claim 6, further comprising:
providing an output utterance by using an utterance sentence as an input and using the expanded utterance generated from the utterance sentence as an input to an utterance generation model that is trained in advance, wherein
the utterance generation model is trained in advance by the expander by using an input utterance sentence included in training data as an input and the expanded utterance generated from the input utterance sentence as an input utterance sentence of the training data.

8. The utterance sentence expansion method according to claim 5, further comprising:
providing an output utterance by using an utterance sentence as an input and using the expanded utterance generated from the utterance sentence as an input to an utterance generation model that is trained in advance, wherein
the utterance generation model is trained in advance by the expander by using an input utterance sentence included in training data as an input and the expanded utterance generated from the input utterance sentence as an input utterance sentence of the training data.

9. A computer-readable non-transitory recording medium storing computer-executable program instruction that when executed by a processor cause a computer system to:

insert, for an utterance that is an utterance to be expanded that includes a noun and an unknown input and are morphologically analyzed in advance, by an expander using information of an expansion dictionary, the expansion dictionary including a plurality of higher-level categories of the noun, one or more higher-level categories of the plurality of higher-level categories of the expansion dictionary corresponding to the noun included in the utterance into a position before the noun of the utterance to generate an expanded utterance, wherein the first noun is automatically indicated by a space and a symbol.

10. The computer-readable non-transitory recording medium according to claim 9, wherein in a case of inserting the plurality of higher-level categories of the expansion dictionary corresponding to the noun included in the utterance, the expander inserts, into a position before the noun of the utterance, the plurality of higher-level categories in such an order that, among the plurality of higher-level categories, a category in a higher-level hierarchy is closer to a beginning of a sentence to generate the expanded utterance.

11. The computer-readable non-transitory recording medium according to claim 10, further comprising:

providing an output utterance by using an utterance sentence as an input and using the expanded utterance generated from the utterance sentence as an input to an utterance generation model that is trained in advance, wherein the utterance generation model is trained in advance by the expander by using an input utterance sentence included in training data as an input and the expanded utterance generated from the input utterance sentence as an input utterance sentence of the training data.

12. The computer-readable non-transitory recording medium according to claim 9, further comprising:

providing an output utterance by using an utterance sentence as an input and using the expanded utterance generated from the utterance sentence as an input to an utterance generation model that is trained in advance, wherein the utterance generation model is trained in advance by the expander by using an input utterance sentence included in training data as an input and the expanded utterance generated from the input utterance sentence as an input utterance sentence of the training data.

* * * * *